(12) United States Patent
Prebeck

(10) Patent No.: US 8,047,941 B2
(45) Date of Patent: Nov. 1, 2011

(54) DRIVE UNIT FOR CONTINUOUSLY VARIABLE ROTATIONAL SPEED CONTROL AND ITS USE

(75) Inventor: Stefan Prebeck, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 863 days.

(21) Appl. No.: 12/045,097

(22) Filed: Mar. 10, 2008

(65) Prior Publication Data

US 2008/0234089 A1    Sep. 25, 2008

(30) Foreign Application Priority Data

Mar. 21, 2007 (DE) .......................... 10 2007 013 493

(51) Int. Cl.
*B62D 11/06* (2006.01)
(52) U.S. Cl. ........................................................ 475/24
(58) Field of Classification Search ................. 475/23, 475/24
See application file for complete search history.

(56) References Cited

U.S. PATENT DOCUMENTS

| | | | | |
|---|---|---|---|---|
| 2,580,946 A * | 1/1952 | Orshansky, Jr. et al. | ........ | 475/24 |
| 3,081,647 A * | 3/1963 | Blenkle | ............ | 475/23 |
| 3,383,952 A | 5/1968 | Christenson | | |
| 3,503,278 A * | 3/1970 | Livezey | .......................... | 74/661 |
| 3,538,790 A * | 11/1970 | Polak | .............. | 475/24 |
| 3,590,658 A * | 7/1971 | Tuck | .............. | 475/24 |
| 4,848,186 A * | 7/1989 | Dorgan et al. | ................ | 475/24 |
| 4,917,200 A * | 4/1990 | Lucius | ................ | 180/6.2 |
| 4,997,412 A * | 3/1991 | Reed | ............... | 475/24 |
| 5,195,600 A * | 3/1993 | Dorgan | ................ | 180/9.1 |
| 6,394,925 B1 | 5/2002 | Wöntner et al. | | |
| 6,413,189 B1 | 7/2002 | Spiess et al. | | |
| 6,648,094 B2 * | 11/2003 | Abend et al. | .................. | 180/367 |
| 7,533,753 B2 * | 5/2009 | Tsukamoto et al. | .......... | 180/242 |
| 7,578,362 B1 * | 8/2009 | Pollman et al. | ............ | 180/6.48 |

FOREIGN PATENT DOCUMENTS

| | | |
|---|---|---|
| DE | 6 79 337 | 8/1939 |
| DE | 1 129 068 | 5/1962 |
| DE | 1 141 545 | 12/1962 |
| DE | 1 630 717 | 10/1970 |
| DE | A 2 017 716 | 11/1970 |
| DE | 39 38 888 A1 | 6/1990 |
| DE | 195 27 754 A1 | 3/1996 |
| DE | 101 23 105 A1 | 11/2002 |
| DE | 103 32 216 A1 | 2/2005 |
| EP | 0 902 213 A1 | 3/1999 |
| WO | WO-99/13245 | 3/1999 |
| WO | WO-00/03160 | 1/2000 |

* cited by examiner

*Primary Examiner* — Dirk Wright

(74) *Attorney, Agent, or Firm* — Davis & Bujold, P.L.L.C.

(57) ABSTRACT

A drive unit (1) for continuously, variably controlling rotational speed and reversing the rotational direction of at least one output shaft. The drive unit (1) having two identical transmission modules (2, 3) with a common input (4) and a way for power splitting a continuously variable rotational speed and reversing the rotational direction.

9 Claims, 1 Drawing Sheet

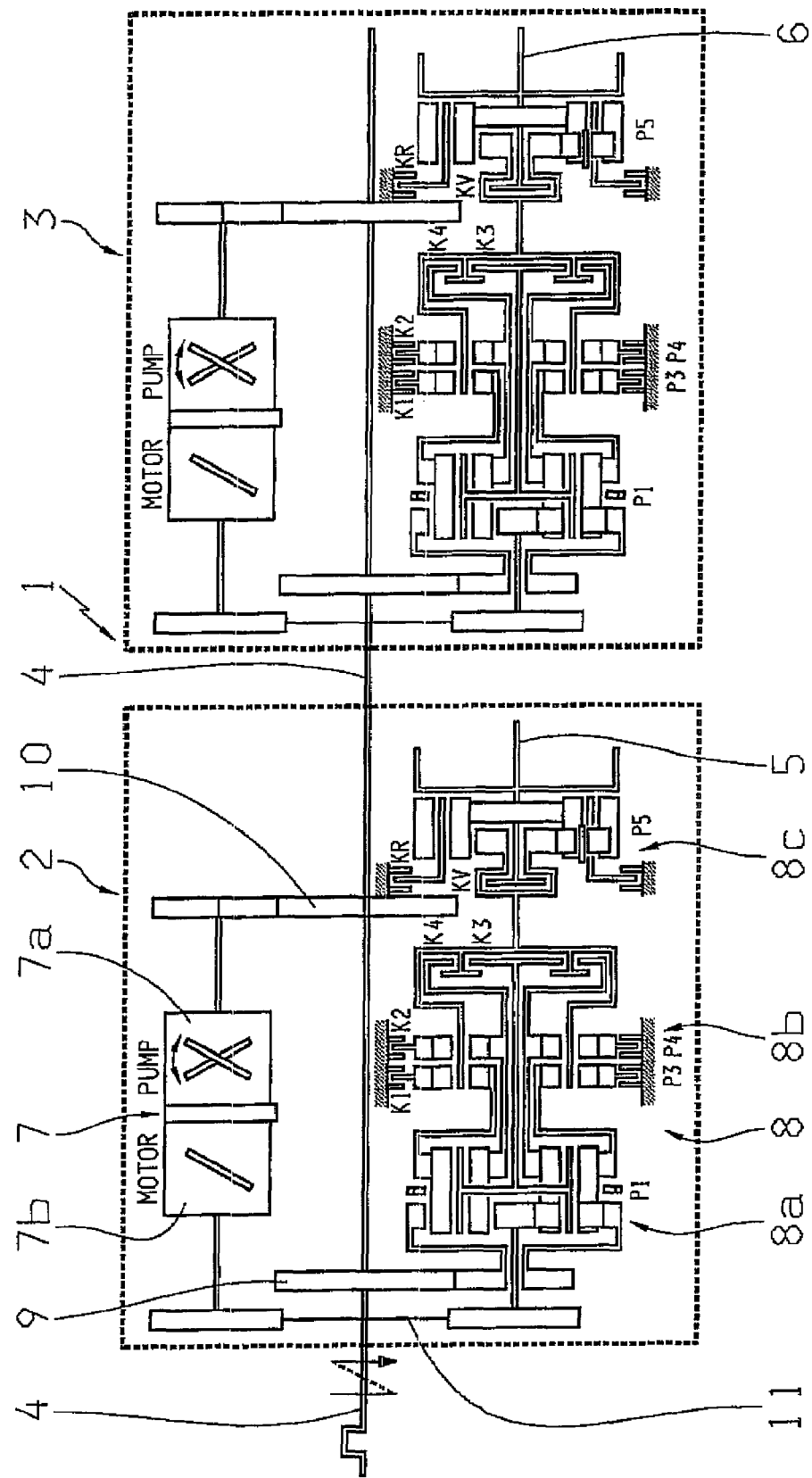

DRIVE UNIT FOR CONTINUOUSLY VARIABLE ROTATIONAL SPEED CONTROL AND ITS USE

This application claims priority from German Application Serial No. 10 2007 013 493.4 filed Mar. 21, 2007.

FIELD OF THE INVENTION

The invention concerns a drive unit as well as its use.

BACKGROUND OF THE INVENTION

Drive units for a continuously variable rotational speed control are known from EP 0 902 213 A1. This known drive unit is based on the principle: of splitting power, in which the power inputted by way of a common drive shaft, is split into a mechanical power portion in the form of a mechanical transmission unit as well as to a continuously variably controllable power portion in the form of a hydrostat. The mechanical transmission unit has a summing transmission by way of which the continuously variably controllable rotational speed of the hydrostat can be superimposed on the input speed of the mechanical transmission unit. Consequently, the transmission has a motor-driven input and a continuously variably controllable output.

A continuously variable controllable output is also advantageous for crawler-type vehicles where two outputs, one for the left track and one for the right track, are in place and where a reversal of the rotational direction also must be possible, for example, when turning the vehicle in place. Known drive unit for crawler-type vehicles have a conventional transmission and a complex downstream power split transmission, which continuously variably distributes the rotational speed and the direction of rotation to both tracks. The conventional transmission must be designed to be able to handle the full engine torque as well as the full engine power.

From DE-A 2 017 716, a steering gear is known for crawler-type vehicles, in which a first differential gear is superimposed on a second differential gear and in which one and/or the other side of the superimposed differential gear can be fully or partially braked. In this way, the two output shafts, that is, the left and the right track of the crawler-type vehicle, can be driven in opposite rotational directions, but continuously variable rotational speed control is not possible with this type of input.

The engine in vehicles with permanent all-wheel drive must also drive two output shafts. Known all-wheel drives are equipped with a transfer transmission installed downstream of a conventional transmission, which transfers torque and power to the front and rear axles of the vehicle, wherein a locking or non-locking linear differential can also be provided. The conventional transmission and transfer transmission must be designed to be able to handle the full engine torque and the full engine power.

From the Applicant's DE 39 38 888 B4, a transfer transmission for a vehicle is known having an all-wheel drive in which the power originating from the engine is passed through a conventional transmission and is transferred by way of planetary gears to the front and rear axles and both outputs are co-axially arranged. A continuously variable rotational speed control for front and rear axle is not provided for the known transmission.

It is an object of the invention to create a continuously variable rotational speed control with the capability of reversing the rotational direction of two output shafts for a drive unit of the aforementioned type, where the drive unit can also be advantageously used for motor vehicles.

SUMMARY OF THE INVENTION

Two identical transmission modules are provided which have a common input, but each has its own output. The individual transmission module has a standard design and is configured as a power split transmission. It has, therefore, a mechanical power branch and a continuously variably controlled power branch, where the latter is preferably configured as a hydrostatic transmission unit comprising an engine and a pump. Other continuously variably controlled transmission units, such as continuously variable transmissions with cone pulleys, are also possible. The mechanical transmission unit comprises mainly a summation gear assembly or accumulative gear assembly in which the input speed on the engine branch and the continuously variably controllable rotational speed of the hydrostatic power branch are superimposed. The mechanical transmission unit can furthermore have a range gear assembly with which the rotational speed or velocity range of the motor vehicle can be expanded. The mechanical transmission unit can finally have a reversing gear assembly for changing the rotational direction (forward gear/reverse gear). The input of both transmission modules is preferably carried out, via a common continuous input shaft, while its output is preferably carried out, via gear wheels, to the mechanical and the hydrostatic power branch of the transmission modules. The advantage of the drive unit, according to the invention, consists in that standardized transmission modules, that is, transmission units that can be produced in large numbers, can be used. In comparison with the state of the art, it is also especially advantageous that the mechanical transmission unit is not actuated with the full engine torque and the full engine power, but (depending on the load, only a proportion of approximately 70% at most) only with half of them.

The use of the drive unit, according to the invention comprising two standardized transmission modules, is particularly advantageous for crawler-type vehicles and vehicles with permanent all-wheel drive in which two output shafts can be continuously variably controlled with reversal of rotational direction. The drive unit is advantageous to vehicles with regard to cost and weight.

BRIEF DESCRIPTION OF THE DRAWING

The invention will now be described, by way of example, with reference to the accompanying drawing in which:
The sole FIGURE shows a drive unit.

DETAILED DESCRIPTION OF THE INVENTION

The single FIGURE shows a drive unit 1, comprising two identical transmission modules 2, 3, which are driven by an engine (not shown) via a common input shaft 4 and has a separate output 5, 6. Both transmission modules 2, 3 are identically configured and standardized as a component or a plug-in module. Each transmission module 2, 3 has the task of continuously variably controlling the rotational speed input via the input shaft 4, spread over an expanded rotational range and makes the reversal of rotational direction at output 5, 6 possible. Each transmission module 2, 3 is configured for this purpose as a known power split transmission and has a continuously variably controlled power branch, which is configured as a hydrostatic transmission unit 7, as well as a mechanical power branch, which is configured as a mechanical transmission unit 8. The hydrostatic transmission unit 7 is comprised of (as is generally known) a pump 7a and an engine 7b. The mechanical transmission unit 8 comprises a summation gear assembly or superimposing gear assembly 8a, which is configured as a planetary gear with two inputs, a range gear assembly 8b for shifting from high to low rotational speed ratios or high and low vehicle velocity, as well as a reverse or reversing gear assembly 8c for reversal of rotational direction. Two gear wheels 9, 10 are arranged on the input shaft 4 within the transmission module 2, which drive the summation gear assembly 8a and the pump 7a. The engine 7b of the hydrostatic transmission unit 7 also transfers power, via a denoted transmission 11, into the summation gear assembly 8a. The rotational speed of the input shaft 4 and the continuously variably controlled rotational speed of engine 7b are thus superimposed in the summation gear assembly 8a. The advantage of the power split consists in that the smaller portion of the power to be transferred passes through the continuously variably controlled and/or hydrostatic power branch. The transmission module 3 is designed similarly to the transmission module 2 and is thus not identified with additional reference numerals. The illustrated hydrostatic transmission unit 7, as well as the mechanical transmission unit 8, shall only be viewed as embodiments that can be replaced by equivalent solutions. The hydrostatic transmission unit 7 can be replaced, for example, by another continuously variably controlled transmission, i.e., a cone pulley with CVT transmission (Continuous Variable Transmission).

The illustrated drive unit 1 is preferably used for crawler-type vehicles as well as for vehicles with permanent all-wheel drive. During the installation of the drive unit 1 in a crawler-type vehicle, the input shaft 4 is driven by a propulsion engine (not illustrated), for example, the combustion engine of the crawler-type vehicle and the two outputs 5, 6 drive the left track and the right track, while a continuously variable rotational speed control, as well as a reversal of rotational direction (tracks running in opposite directions), are possible. The transmission modules 2, 3 do not need to be designed for the full transmission input power (engine output power). For example, the two transmission modules 2, 3 can be designed for 200 hp with a transmission input power of about 360 hp at the input shaft 4.

The drive unit 1 can also be preferably used to drive a front axle and a rear axle of a motor vehicle with permanent all-wheel drive: For example, a propulsion engine (not illustrated) of the all-wheel drive vehicle can drive a continuous shaft, the input shaft 4, which would respectively drive the front axle by way of the output 5 of the transmission module 2 and the rear axle by way of the output 6 of transmission module 3. In a 50:50 torque distribution between the front and rear axles, two equal transmission modules of 200 hp could be installed in a vehicle having an engine power of 380 hp. The output rotational speed of the front and rear axles can be mutually independent and the axles can also be completely decoupled from the engine speed. In this way, an electronic forward or reverse continuously variable advance can be realized for the front axle and can be accordingly adapted to the driving conditions. The function of the longitudinal differential can also be realized with the drive unit according to the invention.

REFERENCE NUMERALS

1 drive unit
2 first transmission module
3 second transmission module
4 input shaft
5 output (first transmission module)
6 output (second transmission module)
7 hydrostatic transmission unit
7a pump
7b engine
8 mechanical transmission unit
8a summation gear assembly
8b range gear assembly
8c reversing gear assembly
9 gear wheel
10 gear wheel
11 transmission

The invention claimed is:

1. A drive unit (1) for a continuously variable rotational speed control having a reversal of rotational direction for at least one input shaft, the drive unit (1) comprising:
   two identical transmission modules (2, 3) each comprising a means for power splitting, a means for continuously variable rotational speed control and a means for reversal of rotational direction, and the two transmission modules (2, 3) being driven by a common input (4), and the two transmission modules (2, 3) being arranged in series with respect to the common input (4); and
   each of the means for the reversal of rotational direction comprises a reversing gear assembly (8c) such that drive from the common input (4) is output from the two transmission modules (2, 3) in forward and reverse rotational directions, the reversing gear assembly (8c) being located downstream from the means for power splitting and the means for continuously variable rotational speed control with respect to a flow of rotational drive from the common input (4).

2. The drive unit (1) according to claim 1, wherein the two identical transmission modules (2, 3) are each a power split transmission having a hydrostatic transmission unit (7) and a mechanical transmission unit (8).

3. The drive unit (1) according to claim 1, wherein the common input is a continuous input shaft (4) that is rotatable in only one rotational direction.

4. The drive unit (1) according to claim 1, wherein the means for continuously variable rotational speed control comprises a hydrostatic transmission unit (7) and a mechanical transmission unit (8).

5. A drive unit (1) for a continuously variable rotational speed control having a reversal of rotational direction for at least one input shaft, the drive unit (1) comprising:
   two identical transmission modules (2, 3) each comprising a means for power splitting, a means for continuously variable rotational speed control and a means for reversal of rotational direction, and the two transmission modules (2, 3) being driven by a common input (4), and the two transmission modules (2, 3) being arranged in series with respect to the common input (4);
   wherein the two identical transmission modules (2, 3) are each a power split transmission having a hydrostatic transmission unit (7) and a mechanical transmission unit (8); and
   the means for power splitting each include first and second inputs (9, 10) which are rotationally fixed to and driven by the common input shaft (4), the first input (9) drives the mechanical transmission unit (8) and the second input (10) drives the hydrostatic transmission unit (7), and the hydrostatic transmission unit (7) comprises an output (11) which drives a further input of the mechanical transmission unit (8) for superimposition of a rotational speed.

6. The drive unit (1) according to claim 5, wherein the input shaft (4) comprises, in each of the two transmission modules (2, 3), a first gear wheel (9) and a second gear wheel (10) which are rotationally fixed thereto, the first gear wheel (9) driving the mechanical transmission unit (8) and the second gear wheel (10) driving the hydrostatic transmission unit (7).

7. The drive unit (1) according to claim 4, wherein the mechanical transmission unit (8) comprises a range gear assembly (8b).

8. The drive unit (1) according to claim 1, wherein each of the two identical transmission modules (2, 3) has an independent output shaft (5, 6).

9. A drive unit (1) for a continuously variable rotational speed control having a reversal of rotational direction for at least one input shaft, the drive unit (1) comprising:

two identical transmission modules (2, 3) each comprising a means for power splitting, a means for continuously variable rotational speed control and a means for reversal of rotational direction, and the two transmission modules (2, 3) being driven by a common input (4), the two transmission modules (2, 3) being arranged in series with respect to the common input (4);

wherein the two identical transmission modules (2, 3) are each a power split transmission having a hydrostatic transmission unit (7) and a mechanical transmission unit (8); and the mechanical transmission unit (8) of each of the two identical transmission modules (2, 3) comprises a summation gear assembly (8a), a range gear assembly (8b) and a reversing gear assembly (8c) which are coaxially aligned with each other and an output shaft (5, 6).

* * * * *